United States Patent [19]

Yamamoto

[11] 4,308,464
[45] Dec. 29, 1981

[54] BULB TYPE TUBULAR TURBINE-GENERATOR

[75] Inventor: Kazuo Yamamoto, Kawasaki, Japan

[73] Assignee: Fuji Electric Co., Ltd., Kawasaki, Japan

[21] Appl. No.: 27,704

[22] Filed: Apr. 6, 1979

[30] Foreign Application Priority Data

Apr. 19, 1978 [JP] Japan .................................. 53/46061
Apr. 19, 1978 [JP] Japan .................................. 53/46062

[51] Int. Cl.³ .............................................. F01D 5/08
[52] U.S. Cl. ........................................ 290/52; 415/175
[58] Field of Search ............................ 290/42, 52, 53;
415/110, 111, 112, 175, 177, 178, 180; 60/DIG.
3; 417/371

[56] References Cited

U.S. PATENT DOCUMENTS

| | | | |
|---|---|---|---|
| 2,474,258 | 1/1946 | Kroon | 415/175 |
| 3,936,681 | 2/1976 | Liebe | 310/54 |
| 4,102,599 | 7/1978 | Ziegler | 290/52 |

Primary Examiner—J. D. Miller
Assistant Examiner—Donald L. Rebsch
Attorney, Agent, or Firm—Sughrue, Mion, Zinn, Macpeak and Seas

[57] ABSTRACT

A bulb type turbine generator in which upper and lower stay vanes house upper and lower oil tanks. The upper oil tank is connected to the rotary shaft bearing portion of the generator through an oil conduit and the lower tank is connected to a bearing portion. The oil conduits are disposed in the interior of the outer case so that oil passing through is cooled by the fluid flow. The outer casing together with the upper and lower stay vanes are divided to facilitate transportation and installation.

14 Claims, 6 Drawing Figures

BULB TYPE TUBULAR TURBINE-GENERATOR

BACKGROUND OF THE INVENTION

This invention relates to a tubular turbine-generator of the bulb type adapted to be used in a small head, and more particularly, to a device for supplying lubrication oil into a rotating shaft bearing portion of such a bulb type turbine-generator.

Generally, a tubular turbine-generator comprises the combination of a Kaplan type turbine having a horizontal or slant shaft and an electric power generator, and two types of tubular turbine generators are known such as a pit type and a bulb type. In the former type, the electric power generator is accommodated in a pit made of, for example, concrete material, and flow paths are formed at both sides thereof. In the latter type, an inner casing is centrally supported in an outer casing by stay vanes and the flow path is defined between the inner and outer casings, the inner casing being of bulb shape to fluid-tightly house the electric power generator therein. The present invention is directed to the latter type of turbine-generator.

An apparatus of relatively large size permitting rotary movement, such as a turbine-generator, requires large amounts of cooled lubrication oil, since its bearing portion generates large amounts of heat due to thermal friction. In the case of the bearing for supporting an upstanding rotary shaft, a self-lubrication-cooling system is adopted, wherein lubricating oil is accumulated in the bearing to which a cooling pipe is connected. Therefore, relatively easy cooling lubrication can be performed. On the other hand, in the case of the bearings for supporting a horizontal rotary shaft, for example those in the main shaft of the tubular turbine-generator, the self-lubrication cooling system is not available due to the mechanical disposition, and therefore, a lubrication oil recirculation system is generally adopted therein which forcibly supplies lubrication oil into the bearing portion. This is shown in FIG. 1.

In FIG. 1, a rotary shaft 1 is supported by a bearing 2 having one end connected to an upper oil tank 3 through a conduit 7 and the other end connected to a lower oil tank 4 to collect the used oil. The lower oil tank 4 is connected to a cooling chamber 6 through a return conduit 8 to supply heated oil in the tank 6 thereinto by a pump 5 disposed in the conduit 8. The cooling chamber 6 is connected to the upper tank 3 to supply cooled oil thereinto. The tank 3 and cooling chamber 6 are disposed outside of the bulb type turbine.

The lubricating oil accumulated in the upper tank 3 is forcibly recirculated in the oil circuit in the direction shown by an arrow A to coolingly lubricate the bearing portion, and the upper oil tank 3 continuously supplies oil into the bearing portion until the termination of the rotary operation even if the oil pump 6 becomes inoperative.

Accordingly with the conventional bulb-type tubular turbine generator, the lubricating oil recirculation system as shown in FIG. 1 is employed, and therefore, the upper tank 3 and the cooling chamber 6 are not disposed in the bulb shaped inner casing (hereinafter simply referred to as "bulb") due to the lack of space. The upper tank and the cooling chamber are installed in the building of the power plant and are connected by long oil conduits to the bearing portion of the turbine-generator accomodated in the bulb. Therefore, such construction requires large space and the power plant building should provide enough room to install the tank and chamber. This is costly and results in a mechanically complicated structure.

Further, conventional small size bulb type tubular turbine-generators of the type having relatively small capacity used in low head, have disadvantages in terms of installation. That is, the bulb-shaped inner casing, the outer casing and the stay vanes are integrally assembled at a factory, but are detachably subdividable into a plurality of pieces along the transverse direction thereof for easy transportation to the installation site. The transversely subdivided pieces are transported to the construction field and are connected with each other at the site.

However, such assembling work is extremely troublesome, requires long periods of time, and the turbine and the electrical power generator must be precisely incorporated into the casing. This requires skillful workers sometimes not available. Further, overhaul of such a device is extremely troublesome.

SUMMARY OF THE INVENTION

It is therefore an object of this invention to overcome the above-mentioned drawbacks and to provide an improved bulb type tubular turbine-generator.

Another object of this invention is to provide such device, incorporating therein a system for supplying lubrication oil into the bearing portion, but eliminating oil cooling means with a simple structure.

Still another object of this invention is to provide such a device which reduces the cost of equipment.

Still another object of this invention is to provide a bulb type tubular turbine-generator of relatively small size, which achieves minimization of installation work at the construction site.

Briefly and in accordance with the present invention, upper and lower stay vanes which centrally dispose the bulb in the outer casing respectively provide upper and lower oil tanks therein. The upper oil tank is connected to the rotary shaft bearing portion of the turbine-generator through an oil conduit and the lower oil tank is connected to the bearing portion through an oil conduit. Further, a return oil conduit is provided between the upper and lower tanks to recirculate the oil by a pump. These oil conduits are disposed in the interior of the outer casing, so that the oil passing through these conduits is cooled by fluid such as water flowing in the flow path defined between the inner and outer casing, and therefore, an oil cooling subsystem is not required.

Additionally, in order to realize easy installation of a small size bulb-turbine-generator in light of transportation from factory to the construction field, according to the present invention, the outer casing is divided into two pieces along the diametrical direction thereof. One of the subdivided portions has flanges at both ends to confront the flanges of the other of the subdivided portions. One of the subdivided portions is installed on a base to horizontally extend the flanges to thus permit surface engagement with the flanges of the other subdivided portion. Furthermore, each of the upper and lower stay vanes is divided into two pieces. One of the pieces is pre-assembled and fixed to the outer casing and the other of the pieces is pre-assembled and fixed to the inner casing. Therefore when the subdivided outer casings are engaged with each other, these pieces of the upper and lower stay vanes will be in surface engagement with each other.

These and other objects of this invention will become apparent from the description of the drawings and the preferred embodiment which follows.

DETAILED DESCRIPTION OF THE INVENTION

Figure 1:
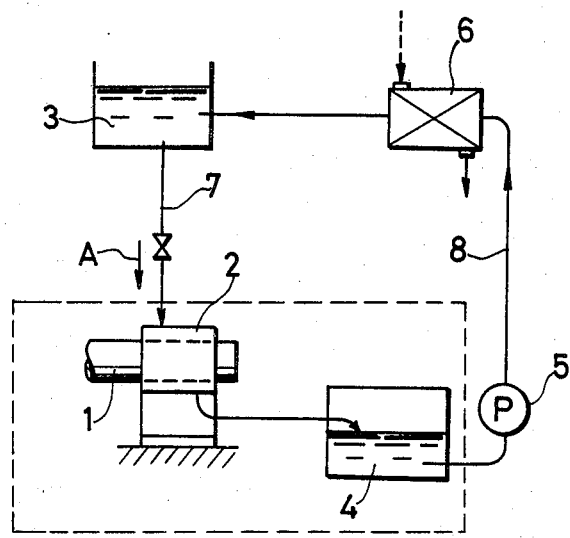
FIG. 1 is a schematic diagram showing the conventional lubrication oil circuit.
Figure 2:
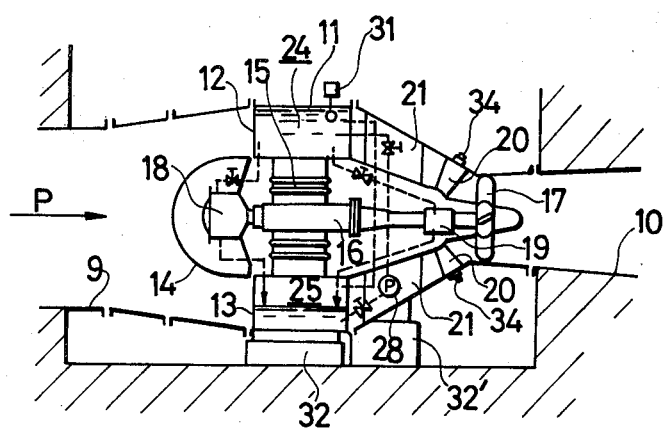
FIG. 2 is a longitudinal cross sectional schematic illustration showing bulb type tubular turbine generator, according to this invention.
Figure 3:
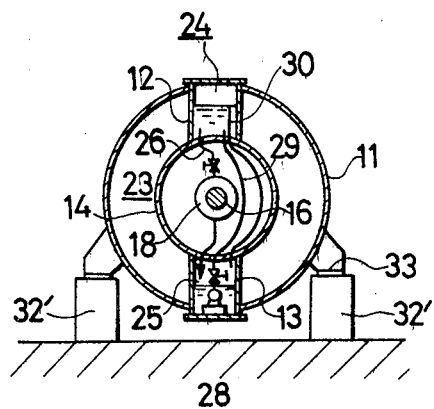
FIG. 3 is a transverse cross sectional schematic illustration taken along the line III—III as viewed from the direction shown by an arrow of FIG. 2.
Figure 4:
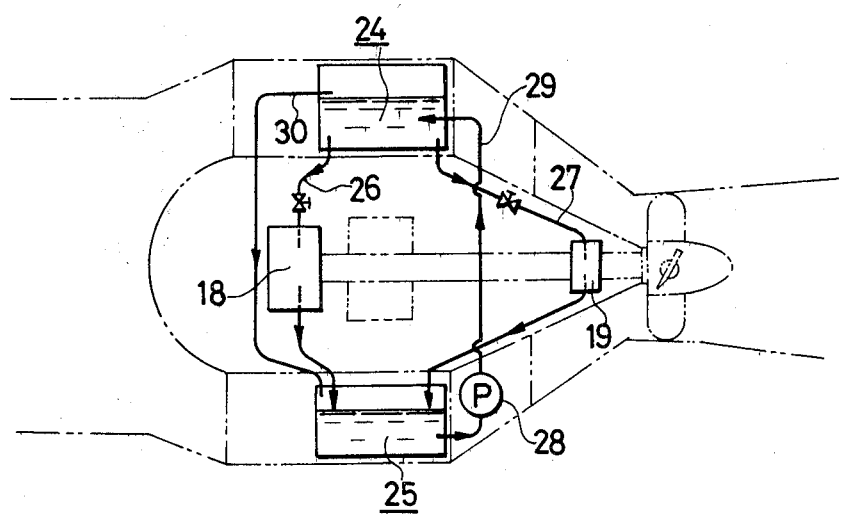
FIG. 4 is a schematic view showing a lubrication oil circuit according to this invention.

This invention will be described in detail with reference to the drawings. Referring to FIGS. 2 to 4, an outer casing 11 of a tubular turbine generator is disposed between a penstock 9 and a draft tube liner 10 and mounted on a central supporting base 32. A bulb 14 (inner casing) is centrally disposed in the outer casing and is supported by upper and lower stay vanes 12 and 13 each positioned between the inner and outer casing. The bulb 14 accomodates therein an electric power generator 15, whose rotary shaft 16 is connected at the end thereof to a turbine runner 17 positioned at the rear end of bulb 14. The rotary shaft 16 is supported by bearings 18, 19 disposed in the bulb 14.

Reference numerals 21 designate a plurality of second sets of stay vanes disposed in a stationary manner between the inner and outer casings to regulate the fluid flow toward a plurality of guide vanes 20. The guide vanes are rotatably disposed about an axis between the inner and outer casings to control fluid direction to effectively rotate turbine runner 17 by, for example, control means 34. Fluid flows into the penstock 9 in the direction shown by an arrow P, and passes through a flow path 23 defined between the inner and outer casings to drive the turbine runner 17.

The foregoing is described to show the basic structure of the bulb type tubular turbine-generator. According to this invention, oil chambers 24 and 25 are provided in the upper and lower stay vanes 12, 13, respectively. The oil chambers 24 and 25 wholly or partly occupy spaces of the stay vanes 12, 13. Further, first and second oil supply conduits 26, 27 (FIGS. 3 and 4) are connected between the upper and lower oil chambers 24, 25, through bearing portions 18, 19, respectively in order to coolingly lubricate these bearings. A return conduit 29 is connected between the upper and lower oil chambers 24, 25. The return conduit 29 is provided with a pump 28 housed in one of the second set of stay vanes 21, to return the oil in the lower oil chamber 25 into the upper oil chamber 24.

Furthermore, an overflow conduit 30 is connected between the upper and lower oil chamber 24, 25, to directly introduce oil in the upper oil chamber 24 into the lower oil chamber 25 when the oil level of the upper oil chamber 24 exceeds a predetermined level. Such oil level is detected by a float switch 31. Reference numeral 33 designates supporting arms extending from the outer casing 11. These arms 33 are mounted on additional supporting bases 32'.

With the structure, since the lubrication oil chambers 24, 25 are confined in the stay vanes 11, 12; the oil conduits 26, 27, 29 and pump 28 confined in one of the stay vanes 21 are positioned in the flow path 23 defined between the inner and outer casings, the elements are always cooled by the fluid flowing through the flow path 23, and therefore the lubricating oil is sufficiently cooled without employing a separate cooling subsystem. Further, since the lubrication oil circuit is disposed in the tubular member by effective space utilization, it is not necessary to provide a space for installing the lower oil tank in a building of the power plant as is done in the conventional system.

Figure 5:
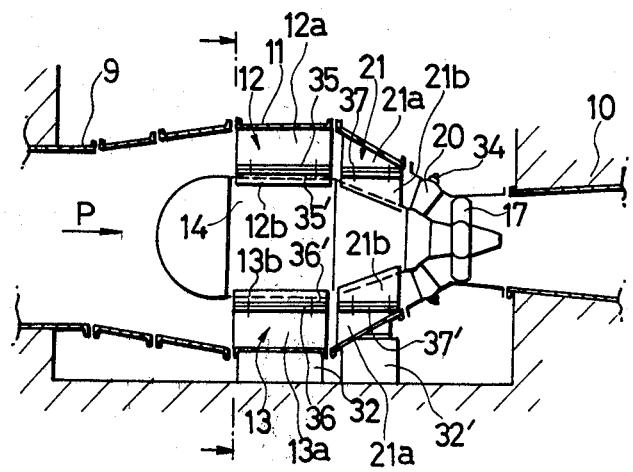
FIG. 5 is a longitudinal cross sectional schematic illustration of a small-size bulb type turbine generator according to this invention.
Figure 6:
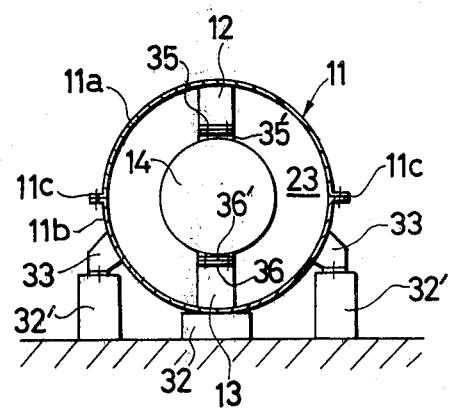
FIG. 6 is a transverse cross sectional schematic illustration taken along the line V—V of FIG. 5.

In the case of a bulb-type tubular turbine generator of relatively small size having small capacity, the invention provides unique structure of outer casing and stay vanes. FIGS. 5 to 6 show the structure wherein like parts and components are designated by the same reference numerals and characters, as those shown in FIGS. 2 to 4.

The outer casing 11 comprises upper and lower subdivided parts 11a, 11b. These parts 11a, 11b are of semi-cylindrical shape and are connected with each other by bolts at flange portions 11c disposed at longitudinal end portions of the subdivided parts to provide a cylindrical outer casing 11 (FIG. 6). For convenience of transportation, the outer casing 11 may be divided into pieces along the transverse direction thereof as shown in FIG. 5. However, in this case, each of the pieces is subdivided along the diameter thereof to provide upper and lower semi-cylindrical parts, and flanges are formed at the arcuate ends of each of the parts to confront with each other.

Furthermore, stay vanes 12, 13 are respectively divided into two stay vane pieces 12a, 12b and 13a, 13b, respectively. One end of the stay vane piece 12a, 13a is fixedly secured to the inner peripheral surface of the outer casing 11 by welding, while the other end thereof is provided with a flanges 35, 36. On the other hand, one end of the other of the stay vane pieces 12b, 13b is fixedly secured to the inner casing 14 and the other end thereof is provided with flanges 35', 36' to confront with the flanges 35, 36. As shown in the drawings, flanges 35, 35', 36, 36' extend into the space defined between the pieces 12a, 12b and 13a, 13b and are connected to each other by bolts so as not to form obstacles against the fluid flow through the flow path 23.

Furthermore, each of the second set of stay vanes 21 is also divided into two pieces 21a, 21b and has internal flanges 37, 37'.

With this structure, the inner casing is detachably mounted from the outer casing by the flanges. The electric power generator and turbine are assembled in the bulb shape inner casing at the factory, and such a unit is transported to the construction site. If the unit is too large to transport, the turbine runner 17 is detachably connected to the bulb, wherein the turbine runner 17 is connected to the rotary shaft by a joint.

The installation work is carried out as follows.

The lower semi-cylindrical casing 11b is fixedly mounted on the supporting base 32 disposed in a pit to horizontally extend the flanges 11c. Then the bulb shaped inner casing 14 incorporating electric power generator and turbine runner is connected to the lower semi-cylindrical casing 11b to align the stay vane piece 13a, 21a with 13b, 21b by confronting and engaging the flanges 35 and 36' and flanges 37' by means of bolts. Thereafter, the upper semi-cylindrical outer casing 11a is installed on the lower semi-cylindrical outer casing 11b, and then flanges 35 and 35', flanges 37 and flanges 11c are fixed with each other by bolts, respectively.

In case of overhaul, respective flanges are disengaged with each other to thus easily remove the inner casing 14.

It is apparent that the oil recirculation circuit as shown in FIG. 4 can be incorporated in the divided structure shown in FIGS. 5 and 6.

While this invention has been described with respect to the preferred embodiments, it is apparent that modifications can be made without departing from the scope of this invention.

What is claimed is:

1. In a bulb type tubular generator having an outer casing, a generator housed in an inner bulb type casing within the outer casing, and a turbine coupled to said generator and protruding in a flow space between said inner and outer casing, the improvement comprising; generator lubrication means disposed inside of the outer casing, means for mounting said inner casing in a spaced relationship from said outer casing, lubrication reservoir means disposed in said mounting means, said mounting means comprising a first set of stay vanes disposed on opposite sides of said bulb, and wherein said lubrication reservoir means comprises first and second chambers disposed in said first set of stay vanes.

2. The device of claim 1 wherein said means for mounting comprises a first set of stay vanes disposed on opposite sides of said bulb.

3. The device of claim 2 wherein said lubrication reservoir means comprises first and second chambers disposed in said first set of stay vanes.

4. The device of claim 1 further comprising bearing means associated with said generator and said turbine, and lubrication conduits coupling said chambers to said bearing means.

5. The device of claims 1 or 4 wherein said first chamber is disposed above said bearing means and said second chamber is disposed below said bearing means, said device further comprising pump means to recirculate lubricant from said second chamber to said first chamber.

6. The device of claims 1 or 4 further comprising each of said stay vanes being divided into two segments, one of said segments of each vane being coupled to said inner casing and the other coupled to said outer casing.

7. The device of claim 6 wherein said outer casing is transversely split along a plane perpendicular to the position of said first set of stay vanes.

8. The device of claim 7 further comprising a second set of stay vanes coupling said inner casing to said outer casing.

9. The device of claim 8 wherein said second set of stay vanes are divided into two segments, one of said segments coupled to said outer casing and the other coupled to said inner casing.

10. The device of claim 9, wherein said outer casing is diametrically split at a position between said first and second set of stay vanes.

11. In a bulb type of tubular generator having an outer casing, a generator housed in an inner bulb type casing within the outer casing, and a turbine coupled to said generator and protruding in a flow space between the inner and outer casings, the improvement comprising; said outer casing being diametrically split to divide the same into first and second compatible component parts; and further comprising first and second sets of stay vanes coupling said inner casing to said outer casing, said sets of stay vanes being disposed on opposite sides of said diametric split, wherein said first set of stay vanes include means for generator lubrication including first and second lubrication chambers disposed therein.

12. The device of claim 11 further comprising said outer casing being transversely split along a plane perpendicular to said diametric split.

13. The device of claim 11, wherein each of said stay vanes is divided into two segments, one of said segments of each vane being coupled to said inner casing and the other coupled to said outer casing.

14. The device of claim 11, wherein said first lubrication chamber is disposed above said generator and said second chamber is disposed below said generator.

* * * * *